Aug. 17, 1948.   W. A. WILLIAMS   2,447,299
FASTENING MEANS
Filed March 14, 1945
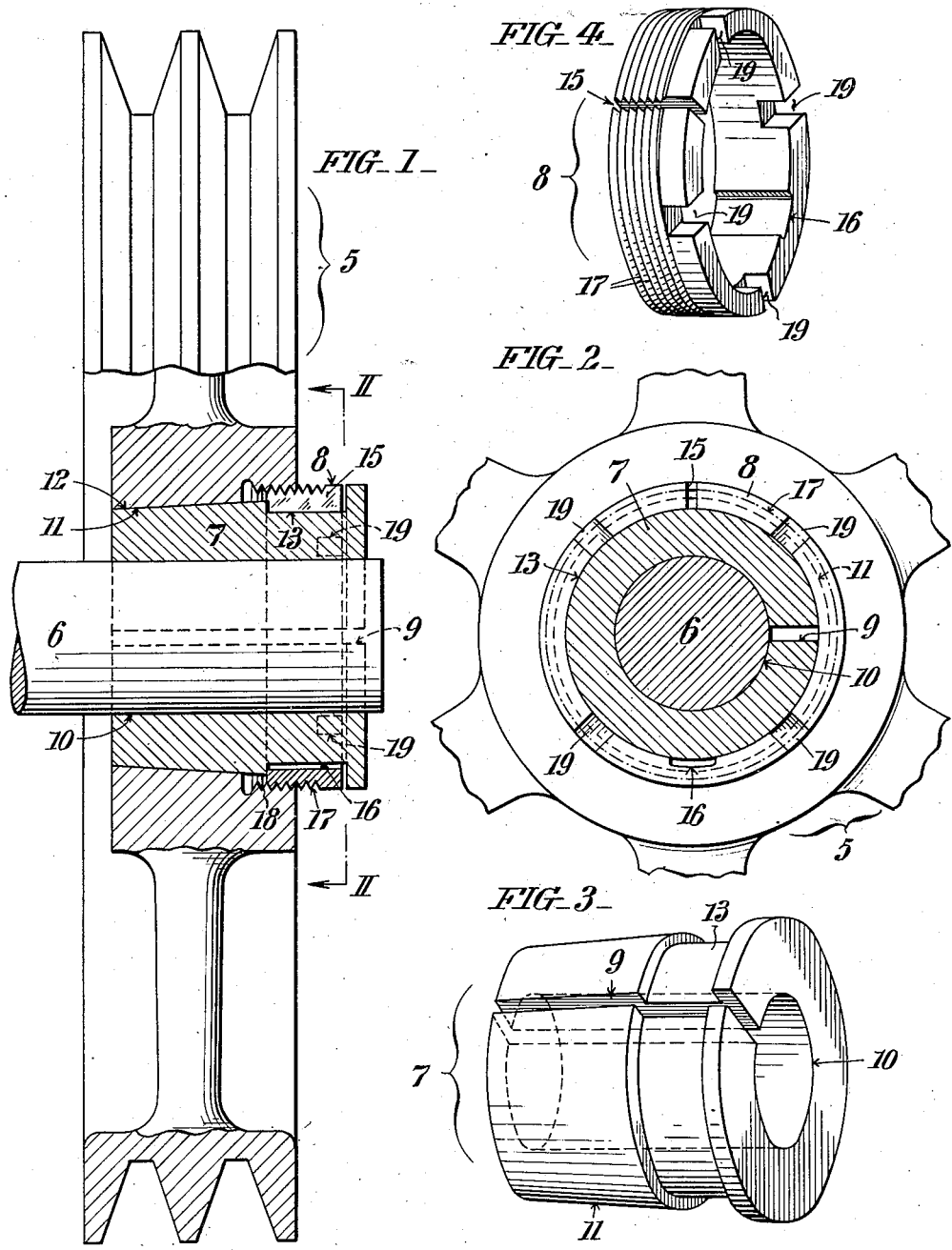
WITNESSES
Hubert Fuchs
Thomas W. Kerr, Jr.
INVENTOR:
William A. Williams,
BY Paul & Paul
ATTORNEYS.

Patented Aug. 17, 1948

2,447,299

UNITED STATES PATENT OFFICE 2,447,299

FASTENING MEANS

William A. Williams, Philadelphia, Pa., assignor to The American Pulley Company, Philadelphia, Pa., a corporation of Pennsylvania Application March 14, 1945, Serial No. 582,675

1 Claim. (Cl. 287—53)

This invention relates to fastening means, and has reference more particularly to means for fixing wheels, levers, cranks, etc., to shafts.

My invention has for its chief aim to provide a means of the kind referred to which is simple in construction, which lends itself to production in quantity at small cost; and which permits of ready and quick application and removal of wheels and the like to and from the shafts.

Other objects and attendant advantages will appear from the following detailed description of the attached drawings, wherein Fig. 1 is a fragmentary view, partly in elevation and partly in axial section, of a wheel and shaft assemblage conveniently embodying my improved fastening means.

Fig. 2 is a fragmentary view in cross section taken as indicated by the angled arrows II—II in Fig. 1.

Figs. 3 and 4 are perspective views of the component parts of the fastening means.

With more detailed reference to these illustrations 5 designates a wheel in the form of a grooved belt pulley, and 6 the shaft which carries the wheel.

The fastening means with which the present invention is more especially concerned comprises two component parts which are generally indicated by the numerals 7 and 8 and which are separately pictured in Figs. 3 and 4.

The component 7 is in the form of a sleeve which is longitudinally split as at 9, and which has a bore 10 of a diameter corresponding substantially to that of the shaft. The outer surface 11 of the component 7 is tapered to engage snugly into the correspondingly tapered bore 12 in the hub of the wheel 5; and adjacent its larger end, said component is provided with a square section circumferential groove 13.

The component 8 has the form of a collar element which is of a width to substantially fill the groove 13 of the component 7 and to be thereby held against relative axial shifting but capable of being rotated therein. As shown, the component 8 is longitudinally split at 15 and reduced in thickness as at 16 at a point directly opposite the split. As a result of this construction, the sleeve 8 can be opened up for placement into the groove 13 of component 7 and afterwards compressed for permanent retainment by the latter. The component 8 is moreover provided with external threads 17 for screw engagement within the tapped counterbore 18 at one end of the wheel hub; and further formed with notches 19 at intervals around its outer face for use of a spanner wrench or the like to turn it.

In preparation for mounting, the sleeve 7 is inserted into the tapered bore 11 of the wheel 5 and the collar 8 incidentally turned in the proper direction and loosely engaged into the tapped counterbore 18 of the wheel hub, whereupon the assemblage is slipped onto the shaft 6. With this accomplished, a wrench is applied to the collar 8 and the latter turned in the same direction as before with the result that through cooperation of said collar and the inner shoulder of the groove 13, the sleeve 7 is shifted leftward in Fig. 1 relative to the wheel 5 and the shaft 6, being thereby effectively wedged between the surfaces of the shaft and the bore of the wheel hub to bind the two in fixed relationship.

Removal of the wheel 5 is accomplished by reversing the above procedure, i. e., by turning the collar 8 in the opposite direction, when, through cooperation of said collar with the outer shoulder of the groove 13, the sleeve will be moved rightward in Fig. 1 and withdrawn from the wheel hub bore 12 and at the same time eased with respect to the shaft 6, whereupon the assemblage can be readily dismounted.

Having thus described my invention, I claim:

A fastening means of the character described comprising a split sleeve adapted to fit over a shaft and externally tapered to engage in a correspondingly tapered bore in a wheel hub, said sleeve being of a length to project beyond one end of the wheel hub and provided at its projecting end with a circumferential groove; and a screw collar confined between the opposite shoulders of the groove with a portion thereof accessible for wrench application beyond the aforesaid end of the wheel hub, and adapted to engage an internal thread in the wheel hub bore so that when turned in one direction the sleeve will be shifted into binding engagement with the shaft surface and the wheel hub bore, and when turned reversely will release said sleeve.

WILLIAM A. WILLIAMS.

REFERENCES CITED

The following references are of record in the file of this patent:

UNITED STATES PATENTS

| Number | Name | Date |
|---|---|---|
| 189,190 | Chapman | Apr. 3, 1877 |
| 418,632 | Wiggins | Dec. 31, 1889 |
| 738,445 | Hoffmann | Sept. 8, 1903 |
| 1,712,408 | Strandlund | May 7, 1929 |
| 1,809,404 | Culbertson | June 9, 1931 |
| 2,331,498 | Otto | Oct. 12, 1943 |